US012037224B2

(12) United States Patent
Shi et al.

(10) Patent No.: US 12,037,224 B2
(45) Date of Patent: Jul. 16, 2024

(54) CRANE EXTENSION AND INSTALLATION DEVICE TO ACHIEVE BIDIRECTIONAL TENSION CONTROL AND METHOD FOR ACHIEVING BIDIRECTIONAL TENSION CONTROL CRANE

(71) Applicant: DALIAN UNIVERSITY OF TECHNOLOGY, Dalian (CN)

(72) Inventors: Wei Shi, Dalian (CN); Zhengru Ren, Dalian (CN); Zhaobo Song, Dalian (CN); Zhiyu Jiang, Dalian (CN); Lixian Zhang, Dalian (CN); Ke Ma, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 560 days.

(21) Appl. No.: 17/288,324

(22) PCT Filed: May 30, 2020

(86) PCT No.: PCT/CN2020/093604
§ 371 (c)(1),
(2) Date: Apr. 23, 2021

(87) PCT Pub. No.: WO2021/057065
PCT Pub. Date: Apr. 1, 2021

(65) Prior Publication Data

US 2021/0371253 A1 Dec. 2, 2021

(30) Foreign Application Priority Data

Sep. 29, 2019 (CN) ......................... 201910932017.3

(51) Int. Cl.
*B66C 13/10* (2006.01)
*B66C 23/60* (2006.01)

(52) U.S. Cl.
CPC ............ *B66C 13/105* (2013.01); *B66C 23/60* (2013.01)

(58) Field of Classification Search
CPC ....... B66C 13/10; B66C 13/105; B66C 23/10; B66C 23/12; B66C 23/60; B66C 13/04;
(Continued)

(56) References Cited

U.S. PATENT DOCUMENTS 4,111,281 A * 9/1978 Jacobs ..................... A62B 1/02 182/142
6,439,407 B1 * 8/2002 Jacoff ..................... B66C 13/08 212/274
(Continued)

FOREIGN PATENT DOCUMENTS

CN 105692448 A 6/2016
CN 207192616 U 4/2018
(Continued)

OTHER PUBLICATIONS

International Search Report issued in corresponding International Application No. PCT/CN2020/093604; mailed Sep. 3, 2020; State Intellectual Property Office of the P.R. China, Beijing, China, 6 pgs.
Written Opinion issued in corresponding International Application No. PCT/CN2020/093604; mailed Sep. 3, 2020; State Intellectual Property Office of the P.R. China, Beijing, China, 7 pgs.

*Primary Examiner* — Sang K Kim
*Assistant Examiner* — Nathaniel L Adams
(74) *Attorney, Agent, or Firm* — HAUPTMAN HAM, LLP

(57) ABSTRACT

A crane extension and installation device includes an extension device, a winch, a pulley and a cable. A main arm includes a vertical slide rail, the main arm is inclined relative to vertical, and three second pulleys at different heights of the slide rail are installed in the vertical direction of the slide rail, and the second pulley can slide vertically along the slide
(Continued)

rail and can be fixed at a certain position of the slide rail. The extension device includes a number of cantilever beams connected end to end. The front end of the extension device is a cantilever beam, and a fixed pulley is installed on the lower peripheral surface of the extension device. The end face of the cantilever beam is equipped with a vertical lower arm through a joint, and the bottom end of the lower arm has a first pulley fixed by the joint.

2 Claims, 2 Drawing Sheets

(58) Field of Classification Search
CPC ....... B66C 13/06; B66C 13/063; B66C 13/08; B66C 13/085; B66C 13/20; B66C 21/00
See application file for complete search history.

(56) References Cited

U.S. PATENT DOCUMENTS

| | | | | |
|---|---|---|---|---|
| 9,346,656 | B2 * | 5/2016 | May | B66C 13/06 |
| 9,950,910 | B2 * | 4/2018 | Sørensen | B66C 13/08 |
| 2008/0216301 | A1 * | 9/2008 | Hansen | B66C 13/08 29/889 |
| 2011/0094987 | A1 * | 4/2011 | Botwright | B66C 13/08 212/270 |

FOREIGN PATENT DOCUMENTS

| | | | |
|---|---|---|---|
| CN | 207209821 | U | 4/2018 |
| CN | 110654987 | A | 1/2020 |
| JP | H06156975 | A | 6/1994 |
| JP | H08119572 | A | 5/1996 |
| JP | H09175784 | A | 7/1997 |

* cited by examiner

CRANE EXTENSION AND INSTALLATION DEVICE TO ACHIEVE BIDIRECTIONAL TENSION CONTROL AND METHOD FOR ACHIEVING BIDIRECTIONAL TENSION CONTROL CRANE

RELATED APPLICATIONS

The present application is a National Phase of International Application Number PCT/CN2020/093604 filed May 30, 2020 and claims priority to Chinese Application Number 201910932017.3 filed Sep. 29, 2019.

TECHNICAL FIELD

The present invention belongs to the field of ocean engineering. The invention relates to a crane extension and installation device, in particular to a crane extension and installation device to achieve bidirectional cable tension control.

BACKGROUND

Crane and cables play a crucial role in the execution of various marine operations, such as lifting and mating operations. For high accuracy offshore installation, cable tension control can be achieved by adding winch to the crane. Active feedback control can greatly improve the installation accuracy. However, only positive tension can be provided when the cable is stretched, and the tension is only unidirectional. Thus, cables fixed to a crane can only provide tension forces pointed to the crane. In actual situations, the resultant force opposite to the crane is also required. For example, during the installation of a single blade of a wind turbine, the suspended blade can be stabilized by actively controlling the force exerted on the cable, thereby accelerating the installation. To overcome the limitation that a cable can only provide unidirectional tension force, pretension is needed, and it gradually increases with the increasing of wind speed. For the control system, such input greatly restricts the feasibility of the system, increases the design difficulty, increases the complexity of the operation, and is not conducive to reliable engineering applications. The present invention proposes a new type of crane installation device. Through this device, the active cable tension control system can provide bidirectional tension input.

SUMMARY

In order to solve the problem of bidirectional regulating load tension and improving offshore hoisting accuracy, the present invention proposes the following technical scheme: a crane extension and installation device to achieve bidirectional tension control, comprising an extension device, a winch, a pulley and a cable. A crane is connected to the extension device in a horizontal direction through a movable joint at one end in a vertical direction, the crane is connected to a crane base through a joint at the other end of the vertical direction, and the crane base is used to fixedly support the crane, a main arm of the crane is installed with a slide rail in the vertical direction, the main arm has an inclination angle to the vertical direction, three second pulleys at different heights of the slide rail are installed in the vertical direction of the slide rail, and the second pulleys can slide vertically along the slide rail, and can be fixed at a certain position of the slide rail, the extension device consists of several cantilever beams connected end-to-end, and a fixed pulley is installed on a lower peripheral surface of the extension device, a front cantilever beam of the extension device has the fixed pulley installed on its lower peripheral surface, and an end face of the front cantilever beam is installed with a vertical lower arm through a joint, a bottom end of the lower arm has a first pulley fixed by it; an end of a load in a horizontal direction is connected to the cable, and the cable bypasses the first pulley, the fixed pulley, and the second pulley with a highest vertical position to connect to a third winch, and the third winch is fixed on the crane base; an other end of the load in the horizontal direction is connected to the cable, and the cable bypasses the second pulley with a lowest vertical position to connect to a first winch, the first winch is fixed on the crane base; a middle part of the load in the horizontal direction is connected to the cable, and the cable bypasses the second pulley in a middle position of the vertical direction to connect to the second winch, and the second winch is fixed on the crane base; the first winch and the third winch are located at ends of the crane base in the horizontal direction, the second winch is located in a middle position of the crane base in the horizontal direction, the first winch is closer to the extension device in the horizontal direction.

Furthermore, the crane base is installed on a platform and the platform is supported from the seabed by a supporting device, so that the platform is located above a water level.

Furthermore, the first winch and the third winch are respectively installed with a device for fixing the winch, which is a separate structure from the crane base where the crane is installed, and the device for fixing the winch of the first winch and third winch are installed in the horizontal direction at two ends of the crane base where the crane is installed, the device for fixing the winch of the first winch is installed closer to the extension device in the horizontal direction.

The crane extension and installation device to achieve bidirectional tension control comprising, the extension device, the winch, the pulley and the cable, the crane is connected to the extension device in a horizontal direction through a movable joint at one end in a vertical direction, the crane is connected to a crane base through a joint at the other end of the vertical direction, and the crane base is used to fixedly support the crane, a main arm of the crane is installed with a slide rail in the vertical direction, the main arm has an inclination angle to the vertical direction, N second pulleys at different heights of the slide rail are installed in the vertical direction of the slide rail, N>4, and the second pulleys can slide vertically along the slide rail, and can be fixed at a certain position of the slide rail, the second pulley comprises a highest position second pulley, a lowest position second pulley and a central position second pulley between the highest position pulley and the lowest position pulley, if a N−2th second pulley in the central position has a higher serial number, the lower a position at the rail thereof; the extension device consists of several cantilever beams connected end-to-end, a front cantilever beam of the extension device has the fixed pulley installed on its lower peripheral surface, and an end face of the front cantilever beam is installed with a lower arm in the vertical direction through a joint, a bottom end of the lower arm has a first pulley fixed by it; an end of the load in a horizontal direction is connected to the cable, and the cable bypasses the first pulley, the fixed pulley, and the second pulley with a highest vertical position to connect to a Nth winch, and the Nth winch is fixed on the crane base; an other end of the load in the horizontal direction is connected to the cable, and the cable bypasses a pulley with a lowest vertical position to connect to a first winch, the first winch is fixed on the crane base; the number of the cables connecting a middle part of the load in the horizontal direction is N−2, and the N−2 of cables bypass the second pulley in a middle position to connect to the second to N−1st winch, and the second to N−1st winch are fixed on the crane base; the first winch and the Nth winch are located at ends of the crane base in the horizontal direction, and the second to N−1st winches are in middle positions of the crane base in the horizontal direction, and the first winch is closer to the extension device in the horizontal direction.

Furthermore, the crane base is installed on a platform and the platform is supported from the seabed by a supporting device, so that the platform is located above a water level.

Furthermore, the first winch and the Nth winch are respectively installed with a device for fixing the winch, which is a separate structure from the crane base where the crane is installed, and the device for fixing the winch of the first winch and Nth winch are installed in the horizontal direction at two ends of the crane base where the crane is installed, the device for fixing the winch of the first winch is installed closer to the extension device in the horizontal direction.

A method for achieving bidirectional tension control crane, wherein the following method is implemented using any one of the abovementioned crane extension and installation device:

Step 101: controlling, by two cables at two ends of a load, two winches connected to the two cables to retract and unwind the two cables, to adjust a tension acting on a load position;

Step 102: controlling the two winches connected to the two cables at the two ends of the load to retract and unwind the two cables, to complete a movement of the load in a horizontal position;

Step 201: controlling, by a cable located in a middle position of the load, the winch connected to the cable to retract and unwind the cable, to complete lifting and lowering of the load;

Step 301: changing a position and a direction of the cable bypassing a second pulley, and changing a direction of tension applied to the load by the cable, by adjusting a vertical position of the second pulley where the second pulley is located on the slide rail;

Step 302: adjusting a first pulley and a fixed pulley, through an expansion and contraction of an extension device and a rotation of a joint, to change a position and a direction of the cable, and change a tension direction applied by the cable at the load position; and Step 303: completing a horizontal transportation of the load, through the expansion and contraction of the extension device and the rotation of the joint.

Beneficial effects of the present invention: active cable tension-control system can adjust the direction of the tension, provide bidirectional tension input and improve offshore hoisting accuracy. Also, it reduces environmental restrictions (for example, wind speed) on offshore hoisting operation and ensures duration. It also improves construction and installation efficiency, and installation success rate, thus improving engineering benefits.

Figure 1:
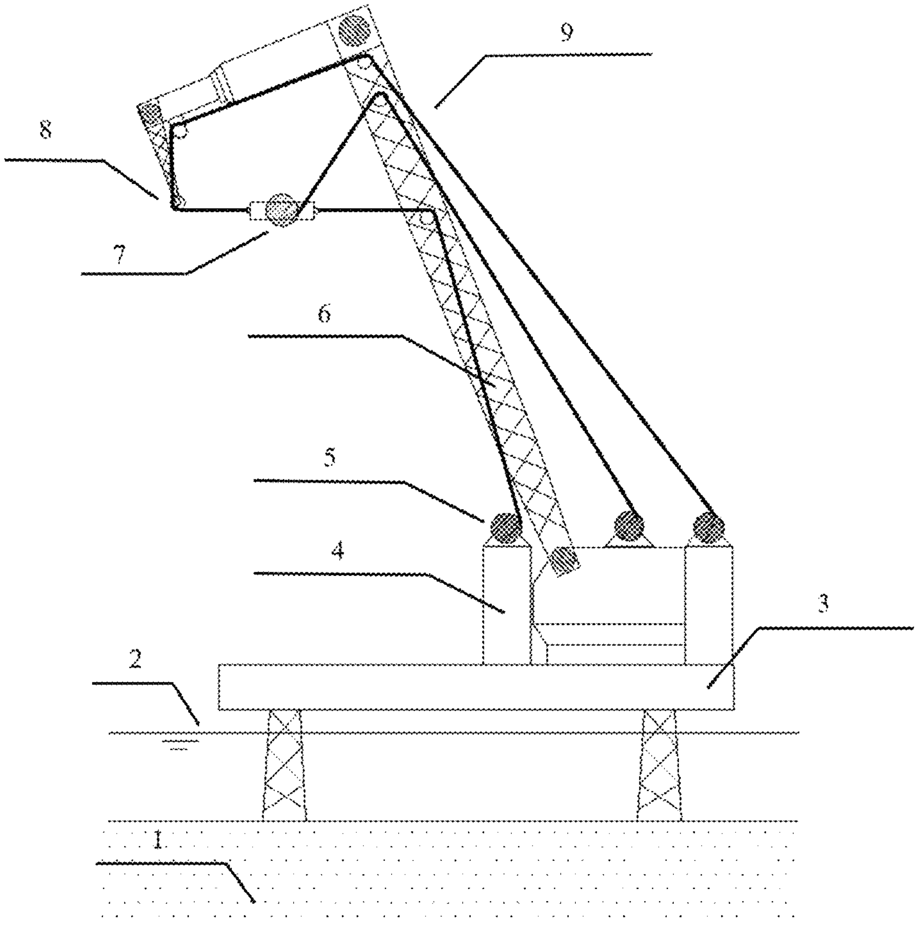
FIG. 1 shows the schematic diagram of the crane auxiliary device and the cable.

In the picture: 1 seabed; 2 water level; 3 installation platform; 4 fixed winch device; 5 winch; 6 crane; 7 load; 8 first pulley; 9 cable; 10 crane base; 11 pulley fixed position; 12 slide rail; 13 extension device; 14 joint; 15 lower arm; 16 second pulley; 17 main arm; 18 fixed pulley.

DETAILED DESCRIPTION OF THE EMBODIMENTS

To enhance the understanding, the present invention will be further described in conjunction with an accompanying technical scheme and drawings hereinafter. The present invention is not limited to the specific embodiment.

Different from the traditional crane, the present invention mainly utilizes extension and installation device added to traditional crane to solve the problem of bidirectional tension adjustment. The device is composed of a pulley, a cable and a winch. Through the change of the position of the pulley, the rotation of the joint and the expansion and contraction of the extension device, the active cable tension control system can change the direction of tension and provide bidirectional tension input, thereby improving the accuracy of offshore lifting and greatly improving the success rate of installation. When the wind speed exceeds the traditional installation range, the present invention can still realize the smooth operation of offshore hoisting operations. Therefore, the present invention reduces the restrictions on offshore lifting operations imposed by environmental conditions such as wind speed, and improves installation efficiency and operation success rate.

The specific solution of the present invention is: by adding the present device to the traditional crane 6 to realize the opposite direction tension to the crane at the end of the device. By connecting the first pulley 8 in the opposite direction, bidirectional active power control can be realized. The present device includes an extension device 13 composed of several cantilever beams connected end to end, wherein the cantilever beams can be integrated or separately installed. Each joint 14 is rotatable. The extension device 13 is actively and passively connected with the crane 6 and the lower crane base 10 to achieve fixation. The winch 5 can be installed on an installation platform pre-set at the lower part of the crane 6 through the corresponding device for fixing the winch 4. The winch 5 can realize many functions, such as constant tension and tension control with controllable feedback. The winch 5 is connected to the load 7 through a number of second pulleys 16. The second pulley 16 on the main arm can be added to any pulley fixed position 11 through the slide rail 12. By pre-adjusting the position of the second pulley 16 on the main arm and the expansion and contraction of the extension device 13 and the rotation of the joint 14, thus changing of the direction and position control of the cable 9 connected to the load 7 can be realized, and finally an appropriate tension is applied to complete the high-precision offshore hoisting task.

The control system can optionally be integrated into the crane control system through wired or wireless mode. In addition, this system should have optional modules such as power supply, controller, receiver, etc.

Figure 2:
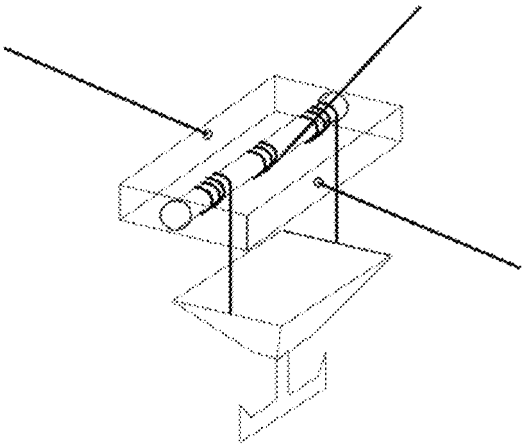
FIG. 2 is a detailed view of the structure at the load position.
Figure 3:
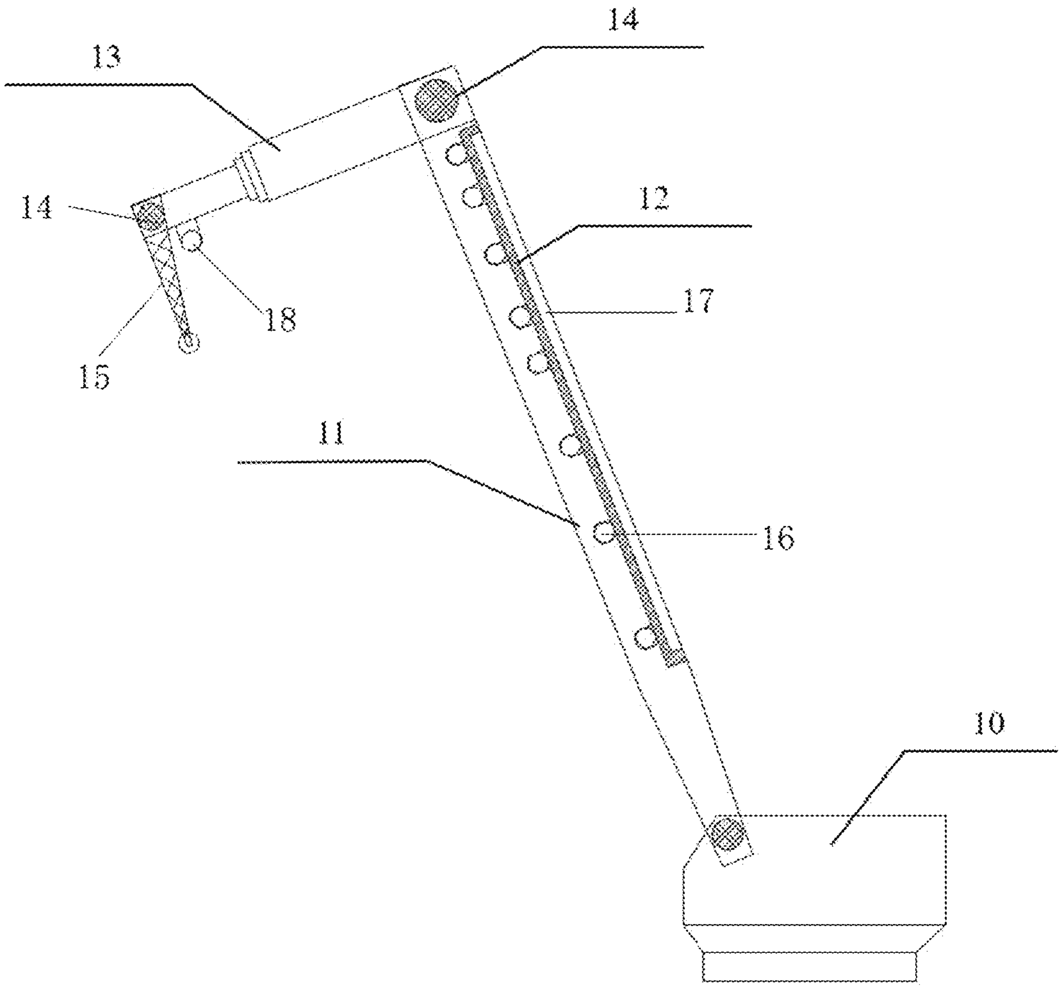
FIG. 3 is a schematic diagram of the arrangement of the pulley.

As shown in FIG. 1, the crane extension and installation device to achieve bidirectional tension control is implemented as follows:

Step 101: Control the winch connected to the cables on two ends of the load 7 position to retract and unwind the cables, so as to adjust the tension acting on the load 7 position;

Step 102: Control the winch connected to the cables on two ends of the load 7 position to retract and unwind the cables, to complete the small movement of the load 7 in the horizontal position;

FIG. 2 is a detailed view of the structure at the load 7 position. The two sides are the cables controlled by the winch 5 and the pulley. This part is composed of 1 pulley and 3 cables. For FIG. 2, the specific implementation is as follows:

Step 201: Control the winch corresponding to the cable in the middle of the load 7 position to retract and unwind the cable, to complete the lifting and lowering operations of the load 7 accordingly;

FIG. 3 is a schematic diagram of the arrangement of the second pulley. For FIG. 3, the specific implementation is as follows:

Step 301: The second pulley 16 on the main arm adjusts the position through the slide rail 12 provided on the crane 6 to change the position and direction of the cables, that is, to change the direction of the tension of the cables acting on the load 7 position;

Step 302: The pulleys in other positions (the first pulley 8 and the fixed pulley 18) adjust the position through the expansion and contraction of the extension device 13 and the rotation of the joint 14, to change the position and direction of the cables, that is, to change the direction of the tension of the cables acting on the load 7 position;

Step 303: Through the expansion and contraction of the extension device 13 and the rotation of the joint 14, the horizontal transportation of the load 7 is completed;

The crane extension installation device proposed by the present invention will reduce the restriction of wind speed and other environmental conditions on offshore hoisting operations, greatly improve installation efficiency and installation success rate, and can achieve precise installation under higher wind speeds and more complicated sea conditions, thereby reducing the cost of offshore engineering structures.

As an implementation example, a crane extension and installation device to achieve bidirectional tension control comprising an extension device, a winch, a pulley and a cable; a crane is connected to the extension device in a horizontal direction through a movable joint at one end in a vertical direction, the crane is connected to a crane base 10 through a joint at the other end of the vertical direction, and the crane base 10 is used to fixedly support the crane, a main arm of the crane is installed with a slide rail 12 in the vertical direction, the main arm has an inclination angle to the vertical direction, three second pulleys 16 at different heights of the slide rail 12 are installed in the vertical direction of the slide rail 12, and the second pulleys 16 can slide vertically along the slide rail 12, and can be fixed at a certain position of the slide rail 12, the extension device consists of several cantilever beams connected end-to-end, and a fixed pulley is installed on a lower peripheral surface of the extension device, a front cantilever beam of the extension device has the fixed pulley installed on its lower peripheral surface, and an end face of the front cantilever beam is installed with a vertical lower arm 15 through a joint, a bottom end of the lower arm 15 has a first pulley 8 fixed by it; an end of a load 7 in a horizontal direction is connected to the cable, and the cable bypasses the first pulley 8, the fixed pulley, and the second pulley 16 with a highest vertical position to connect to a third winch, and the third winch is fixed on the crane base 10; an other end of the load 7 in the horizontal direction is connected to the cable, and the cable bypasses the second pulley 16 with a lowest vertical position to connect to a first winch, the first winch is fixed on the crane base 10; a middle part of the load 7 in the horizontal direction is connected to the cable, and the cable bypasses the second pulley 16 in a middle position of the vertical direction to connect to the second winch, and the second winch is fixed on the crane base 10; the first winch and the third winch are located at ends of the crane base 10 in the horizontal direction, the second winch is located in a middle position of the crane base 10 in the horizontal direction, the first winch is closer to the extension device in the horizontal direction.

Furthermore, the crane base 10 is installed on a platform and the platform is supported from the seabed by a supporting device, so that the platform is located above a water level 2.

Furthermore, the first winch and the third winch are respectively installed with a device for fixing the winch 4, which is a separate structure from the crane base 10 where the crane is installed, and the device for fixing the winch 4 of the first winch and third winch are installed in the horizontal direction at two ends of the crane base 10 where the crane is installed, the device for fixing the winch 4 of the first winch is installed closer to the extension device in the horizontal direction.

The crane extension and installation device to achieve bidirectional tension control comprising, the extension device, the winch, the pulley and the cable, the crane is connected to the extension device in a horizontal direction through a movable joint at one end in a vertical direction, the crane is connected to a crane base 10 through a joint at the other end of the vertical direction, and the crane base 10 is used to fixedly support the crane, a main arm of the crane is installed with a slide rail 12 in the vertical direction, the main arm has an inclination angle to the vertical direction, N second pulleys 16 at different heights of the slide rail 12 are installed in the vertical direction of the slide rail 12, N≥4, and the second pulleys 16 can slide vertically along the slide rail 12, and can be fixed at a certain position of the slide rail 12, the second pulley 16 comprises a highest position second pulley 16, a lowest position second pulley 16 and a central position second pulley 16 between the highest position pulley and the lowest position pulley, if a N−2th second pulley 16 in the central position has a higher serial number, the lower a position at the rail 12 thereof; the extension device consists of several cantilever beams connected end-to-end, a front cantilever beam of the extension device has the fixed pulley installed on its lower peripheral surface, and an end face of the front cantilever beam is installed with a lower arm 15 in the vertical direction through a joint, a bottom end of the lower arm 15 has a first pulley 8 fixed by it; an end of the load 7 in a horizontal direction is connected to the cable, and the cable bypasses the first pulley 8, the fixed pulley, and the second pulley 16 with a highest vertical position to connect to a Nth winch, and the Nth winch is fixed on the crane base 10; an other end of the load 7 in the horizontal direction is connected to the cable, and the cable bypasses a pulley with a lowest vertical position to connect to a first winch, the first winch is fixed on the crane base 10; the number of the cables connecting a middle part of the load 7 in the horizontal direction is N−2, and the N−2 of cables bypass the second pulley 16 in a middle position to connect to the second to N−1st winch, and the second to N−1st winch are fixed on the crane base 10; the first winch and the Nth winch are located at ends of the crane base 10 in the horizontal direction, and the second to N−1st winches are in middle positions of the crane base 10 in the horizontal direction, and the first winch is closer to the extension device in the horizontal direction.

Furthermore, the crane base 10 is installed on a platform and the platform is supported from the seabed by a supporting device, so that the platform is located above a water level 2.

Furthermore, the first winch and the Nth winch are respectively installed with a device for fixing the winch 4, which is a separate structure from the crane base 10 where the crane is installed, and the device for fixing the winch 4 of the first winch and Nth winch are installed in the horizontal direction at two ends of the crane base 10 where the crane is installed, the device for fixing the winch 4 of the first winch is installed closer to the extension device in the horizontal direction.

The method for achieving bidirectional tension control crane, wherein the following method is implemented using any one of the above crane extension and installation device:

Step 101: controlling, by two cables at two ends of a load 7, two winches connected to the two cables to retract and unwind the two cables, to adjust a tension acting on a load 7 position;

Step 102: controlling the two winches connected to the two cables at the two ends of the load 7 to retract and unwind the two cables, to complete a movement of the load 7 in a horizontal position;

Step 201: controlling, by a cable located in a middle position of the load 7, the winch connected to the cable to retract and unwind the cable, to complete lifting and lowering of the load 7;

Step 301: changing a position and a direction of the cable bypassing a second pulley 16, and changing a direction of tension applied to the load 7 by the cable, by adjusting a vertical position of the second pulley 16 where the second pulley is located on the slide rail 12;

Step 302: adjusting a first pulley 8 and a fixed pulley 18, through an expansion and contraction of an extension device and a rotation of a joint, to change a position and a direction of the cable, and change a tension direction applied by the cable at the load 7 position; and Step 303: completing a horizontal transportation of the load 7, through the expansion and contraction of the extension device and the rotation of the joint.

The above is the detailed description of the present invention, the protection range includes but is not limited to what is mentioned above. Any technician who is familiar with this technical field replaces or revises technical schemes and inventive created based on the present invention within the technical scope disclosed in this invention, the schemes and inventive should be involved in the protection range of this invention.

The invention claimed is:

1. A crane extension and installation device to achieve bidirectional tension control comprising an extension device, a plurality of winches, a pulley and a plurality of cables; a crane is connected to the extension device in a horizontal direction through a movable joint at one end in a vertical direction, the crane is connected to a crane base through a first joint at the other end in the vertical direction, and the crane base is used to support the crane, a main arm of the crane is installed with a slide rail in the vertical direction, the main arm has an inclination angle to the vertical direction, three second pulleys at different heights of the slide rail are installed in the vertical direction of the slide rail, and the second pulleys can slide vertically along the slide rail, and can be fixed at a certain position of the slide rail, the extension device consists of several cantilever beams connected end-to-end, and a fixed pulley is installed on a lower peripheral surface of the extension device, a front cantilever beam of the extension device has the fixed pulley installed on its lower peripheral surface, and an end face of the front cantilever beam is installed with a vertical lower arm through a second joint, a bottom end of the lower arm has a first pulley fixed by the bottom end; an end of a load in a horizontal direction is connected to a first cable of the plurality of cables, and the first cable bypasses the first pulley, the fixed pulley, and the second pulley with a highest vertical position to connect to a third winch of the plurality of winches, and the third winch is fixed on the crane base; an other end of the load in the horizontal direction is connected to a second cable of the plurality of cables, and the second cable bypasses the second pulley with a lowest vertical position to connect to a first winch of the plurality of winches, the first winch is fixed on the crane base; a middle part of the load in the horizontal direction is connected to a third cable of the plurality of cables, and the third cable bypasses the second pulley in a middle position of the vertical direction to connect to a second winch of the plurality of winches, and the second winch is fixed on the crane base; the first winch and the third winch are located at ends of the crane base in the horizontal direction, the second winch is located in a middle position of the crane base in the horizontal direction, the first winch is closer to the extension device in the horizontal direction.

2. The crane extension and installation device to achieve bidirectional tension control according to claim 1, wherein the crane base is installed on a platform and the platform is supported from the seabed by a supporting device, so that the platform is located above a water level.

* * * * *